United States Patent [19]
Howe

[11] 3,932,284
[45] Jan. 13, 1976

[54] BARREL SHAPED MERCURY SEPARATOR WITH SPOKED AGITATOR

[75] Inventor: Fred Ellsworth Howe, Kimberley, Canada

[73] Assignee: Cominco Ltd., Vancouver, Canada

[22] Filed: Jan. 6, 1975

[21] Appl. No.: 538,728

[52] U.S. Cl. .............. 210/523; 210/219; 210/319; 55/228
[51] Int. Cl.² ........................................ B01D 21/01
[58] Field of Search ......... 210/49, 69, 65, 213, 219, 210/251, 319, 523; 55/228

[56] References Cited
UNITED STATES PATENTS

| 402,657 | 5/1889 | Davis | 210/219 |
|---|---|---|---|
| 992,629 | 5/1911 | Akins | 210/523 X |
| 1,722,571 | 7/1929 | Green | 210/49 |
| 1,795,495 | 3/1931 | Lavett | 210/213 X |
| 2,553,936 | 5/1951 | Patrick | 210/194 X |

Primary Examiner—John Adee

[57] ABSTRACT

Apparatus for separating mercury from mercury containing material is disclosed. Apparatus comprises a closed horizontal generally barrelshaped vessel having ports for charging the vessel and for discharging the mercury and the treated residue, and agitating means. The vessel has opposed conical sections and a central cylindrical section. The agitating means comprises a rotatable spindle coaxially extending within the vessel and provided with a plurality of spokes varying in length to conform with the shape of the vessel. Preferably the spokes are provided with knife-like tips and they may be arranged in rows, the spokes in each row being off-set from the spokes in the next row except for those in the central cylindrical section.

7 Claims, 5 Drawing Figures

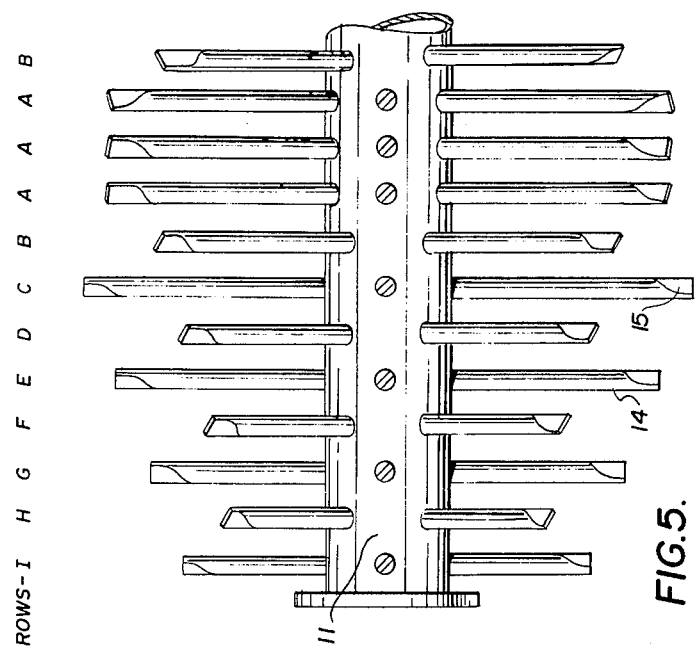
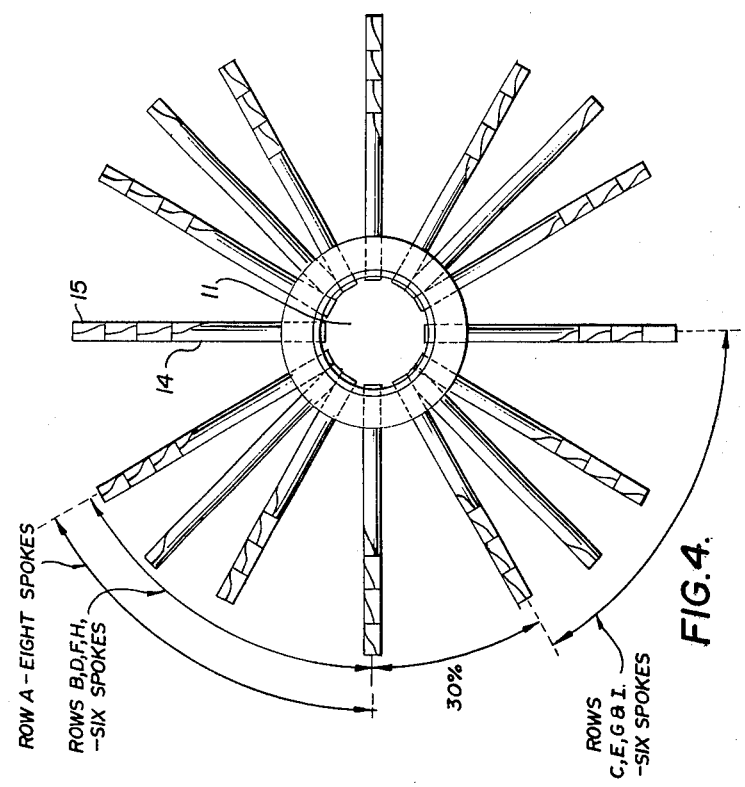
FIG.5.
FIG.4.

BARREL SHAPED MERCURY SEPARATOR WITH SPOKED AGITATOR

BACKGROUND OF THE INVENTION

1. Field of the Invention

This invention relates to a method and an apparatus for separating and recovering mercury from the mercurial "soot" condensed following the roasting of mercury ore. The mercurial "soot" is a mixture of fine globules of mercury (floured mercury), ore dust, mercury salts, ashes, tar and other condensation products, possibly arsenic and antimony compounds, and water. Soot may contain 20 – 85% mercury. Mercury recovered from the separator following the lime treatment there is stored to await shipment.

2. The Prior Art

Conventional methods of treating "soot" for separation of mercury comprise hoeing, with or without the addition of lime and application of heat, burning, pressing in pans with stirrer or rollers, or heating under vacuum. Some of the methods produce relatively less yields of mercury, and industrial hygiene is a problem. Difficulties are encountered with adequate separation of the mercury in the soot treatment and with the subsequent handling of the treated soot prior to and at the roaster.

Moreover, in at least one operating mercury plant, previously it had been necessary to re-pulp the treated soot with water and pump it out to storage and then re-lime the treated soot before returning it to the roaster. The present invention avoids these difficulties in not having to re-pulp the treated soot before returning it to the roaster thus reducing lime consumption in the order of about 20%. Moreover, operating time per batch is virtually cut in half.

STATEMENT OF THE INVENTION

According to the present invention, mercury containing material from mercury condensers is treated with quick-lime in the separator agitation being achieved both mechanically and as a result of chemical action. Here the separated mercury is discharged from the separator vessel through a port equipped with a mercury seal to a storage tank. Residue is discharged through another port and returned directly to the roaster for re-treatment. Although a slight vacuum is maintained during operation to prevent escape of mercury vapours, the substantially air-tight vessel is also equipped with ports for charging material and for ventilation.

DETAILED DESCRIPTION OF THE INVENTION

The novel separator comprises a closed horizontal generally barrel-shaped vessel having opposed conical end sections and a central cylindrical section and provided with ports for charging the vessel and for discharging the mercury and the treated residue, agitating means comprising a rotatable spindle coaxially extending within said vessel and provided with a plurality of spokes varying in length to conform with the shape of the vessel. These spokes provide a shearing action which allows mercury in the particles of soot to coalesce into droplets. Preferably the spokes are provided with knife-like tips. The knife-like tips keep the friction or drag effect to a minimum by cutting away the scale from the vessel wall, and hardening the surface of these tips reduces wear. In embodiments that illustrate a preferred form of the invention:

FIG. 4 is an end view of part of the separator illustrating the arrangement of the spokes.

FIG. 5 is a side elevation of part of the separator illustrating the arrangement of the spokes.

Figure 1:
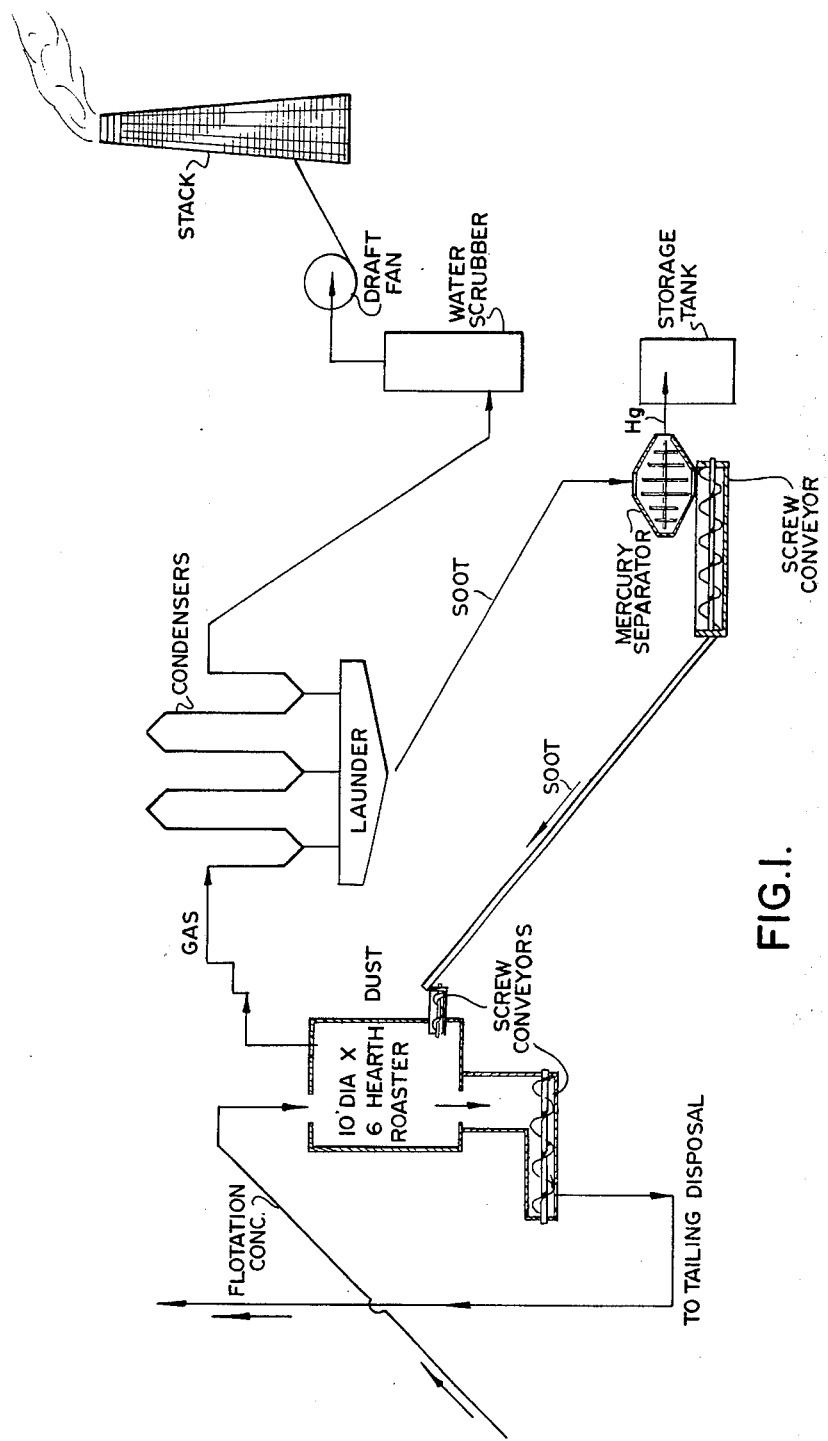
FIG. 1 is a flow diagram of mercury separating process illustrating the position of the novel separator.

Referring to FIG. 1, it will be seen that the separated mercury is discharged from the mercury separator to a storage tank. Moreover, the residue is discharged from the mercury separator directly to a roaster for re-treatment.

Figure 2:
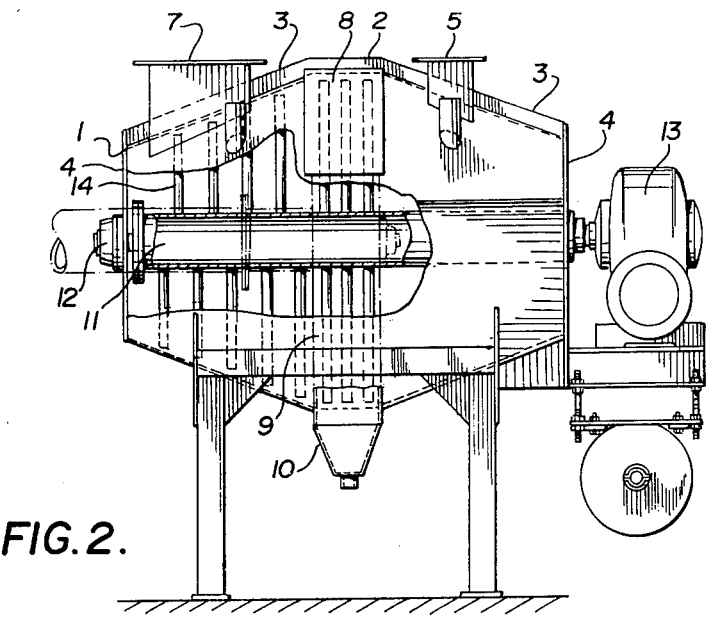
FIG. 2 is a side elevation of the novel separator.
Figure 3:
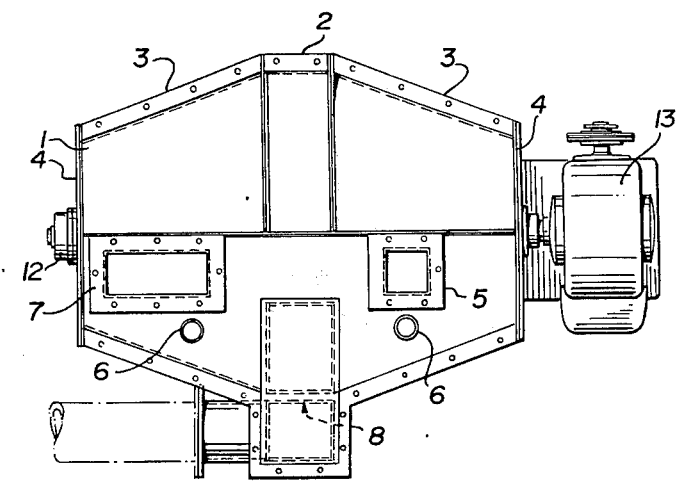
FIG. 3 is a plan view of the novel separator.

Referring to FIGS. 2 and 3, the vessel 1 is made up of a central cylindrical section 2 abutted by two truncated cone end sections 3, and is closed at both ends by vertical walls 4. The vessel 1 is provided with lime-addition port 5, mercurial soot addition ports 6, ventilation ports 7, and port 8 for discharging treated soot by means of a screw conveyor (not shown) to return it to the roaster as illustrated in FIG. 1. The separated mercury drains to the centrally located well 9 for automatic discharge through a mercury seal and valve arrangement 10. A spindle 11 is rotatably mounted within the vessel 1 in bearings 12, one end of the spindle 11 being operably connected to a drive means 13. The spindle 11 is provided with a plurality of spokes 14. The spokes 14 vary in length, conforming with the shape of the vessel 1; their arrangement is in parallel rows perpendicular to the axis of the spindle 11, as best seen in FIGS. 4 and 5.

Referring to FIGS. 4 and 5, all spokes 14 of each row are of the same length and are spaced equi-angularly and except for the three centre rows A, the spoke positions of each row are off-set from those of the next row. The spokes 14 are provided with knife-like tips 15. Spoke lengths are such that all spoke tips 15 are equidistant from the walls of the vessel. The tips 15 provide scraping action such that a minimum amount of material is permitted to cling to the vessel wall. In one embodiment, there are six spokes in each of the three centre rows A. The rest of the rows (sixteen) have only four spokes, each row being off-set 45° from the next. In the most preferred embodiment, the three centre rows A have eight spokes with the rest (sixteen) having six spokes each. Spokes of each row are off-set 30° from those of the next row.

It will be appreciated that in carrying out the method of the present invention, arrangement of, and distance between the spokes are important; if they are too far apart, there is no upward movement of the mixture in the drum, if too close, all of the mixture is carried right around within the drum or bridging occurs. Under optimum operating conditions, the spokes when in the more upward positions are free of mixture, providing a self-cleaning arrangement. Rotation of the mixer spindle at about 14 r.p.m. tends to push the mixture well up the side of the drum, thus helping to keep the soot loose and permitting the mercury to settle to the bottom. The separator is filled only to the centre line with about 250 lbs. of lime and from about 250 to about 400 lbs. of untreated soot for each batch operation, and the mixing-separating operation takes about forty-five minutes. The direction of the spindle rotation is then reversed and the treated soot pushed up the other side of the drum to the discharge port. Discharging takes about fifteen minutes.

In the condensed material from the launders following the condensers much of the mercury has already separated and more tends to coalesce immediately. All this mercury passes through the separator on its way to the mercury storage tank. The remainder, in the soot, is a very fine uncoalesced material which requires the lime treatment to induce further separation. Normally, about 50% of the untreated soot is mercury and the treated soot returned to the roaster has about 15% mercury content. Water content of the soot is variable, but the viscous untreated soot-water mix averages about 50% solids, whereas after treatment the free moisture content is 3 to 5%. The remainder of the water is bound up in hydration of the lime. Heat released by the slaking of the lime provides a partial drying out of the treated soot which is then dry enough for return to the roaster. The temperature of the treated material is about 65°C.

Lime treatment of the soot tends to cause a hard scale to form on the inside of the drum. By flattening the spoke tips, a dull knife edge is provided which cuts into the scale and thus also prevents jamming and excess vibration. Scale removal is improved by having the line of the tip edge at a 45° angle to the spindle axis, and having alternate spoke tip edges twisted in opposite directions to equalize side thrust effect created by operation of the apparatus. Hardened spoke tips may be used for wear resistance, and practice has been to use Stellite (trademark for non-ferrous alloys of cobalt, chromium and tungsten). Because the spoke tips may provide the greatest maintenance problem, to avoid replacement of the whole spindle including all the spokes, the end portion of each spoke, say six inches, may be made removable using male-female threaded sections. With the novel separator, the dry treated soot can be effectively discharged from the vessel by reversing spindle operation. It is then carried by conveyors directly to a drying hearth of the roaster.

WHAT I CLAIM AS MY INVENTION IS:

1. Apparatus for separating mercury from mercury containing material comprising a closed horizontal generally barrel-shaped vessel, having opposed conical end sections and a central cylindrical section, and provided with ports for charging the vessel, and for discharging the mercury and the treated residue, agitating means comprising a rotatable spindle coaxially extending within said vessel, and provided with a plurality of spokes, said spokes being arranged in rows, said rows of spokes being parallel to each other and equally spaced along the length of the spindle, each row having at least four spokes equiangularly positioned about the circumference of the spindle, the spokes in each row being off-set from the spokes in the next row except for those in the central cylindrical section which are not off-set, said spokes being of equal length in each row, but of different lengths in different rows, such that a constant distance exists between the free ends of each of the spokes and the inner wall of the vessel.

2. An apparatus according to claim 1 wherein the three centre rows have eight spokes, and the remaining rows each have six spokes, wherein the spokes of each row are off-set 30° from those of the next row.

3. Apparatus as claimed in claim 1 wherein the spokes are provided with knife-like tips.

4. Apparatus as claimed in claim 3, wherein the knife-like tips are adapted to be attached to the spoke without detaching the spoke from the spindle.

5. Apparatus as claimed in claim 4, wherein the knife-like tips are adapted to be detached from the spoke without detaching the spoke from the spindle.

6. Apparatus according to claim 3 wherein the knife-like tips are fabricated from wear-resistant material.

7. Apparatus as claimed in claim 4 wherein the knife-like tips are fabricated from wear-resistant material.

* * * * *